United States Patent
Chen et al.

(10) Patent No.: US 11,234,275 B2
(45) Date of Patent: Jan. 25, 2022

(54) METHOD FOR RECEIVING AND SENDING INFORMATION, USER EQUIPMENT AND NETWORK DEVICE

(71) Applicant: VIVO MOBILE COMMUNICATION CO., LTD., Chang'an Dongguan (CN)

(72) Inventors: Li Chen, Chang'an Dongguan (CN); Xiaodong Shen, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 16/961,613

(22) PCT Filed: Jan. 4, 2019

(86) PCT No.: PCT/CN2019/070364
§ 371 (c)(1),
(2) Date: Jul. 10, 2020

(87) PCT Pub. No.: WO2019/137305
PCT Pub. Date: Jul. 18, 2019

(65) Prior Publication Data
US 2020/0359425 A1    Nov. 12, 2020

(30) Foreign Application Priority Data
Jan. 10, 2018    (CN) .......................... 201810023325.X

(51) Int. Cl.
*H04W 76/11*    (2018.01)
*H04W 74/08*    (2009.01)
(Continued)

(52) U.S. Cl.
CPC ......... *H04W 74/0833* (2013.01); *H04W 4/06* (2013.01); *H04W 4/12* (2013.01); *H04W 24/10* (2013.01); *H04W 76/11* (2018.02)

(58) Field of Classification Search
CPC ........... H04W 4/06; H04W 4/12; H04W 4/70; H04W 24/00; H04W 24/02; H04W 24/10;
(Continued)

(56) References Cited

U.S. PATENT DOCUMENTS 9,955,508 B2 * 4/2018 Lee ........................... H04L 1/00
2015/0016312 A1   1/2015 Li et al.
(Continued)

FOREIGN PATENT DOCUMENTS

CN    104254135 A    12/2014
CN    104812082 A    7/2015
(Continued)

OTHER PUBLICATIONS

International Search Report & Written Opinion related to Application No. PCT/CN2019/070364; dated Jul. 23, 2020.
(Continued)

*Primary Examiner* — Jean A Gelin
(74) *Attorney, Agent, or Firm* — von Briesen & Roper, s.c.

(57) ABSTRACT

A method for receiving and sending information, a user equipment, and a network device are provided. The method for receiving and sending information includes: determining the number of repetitions for an uplink channel or uplink and downlink channels of a user equipment for a random access channel procedure; in the RACH procedure, based on the number of repetitions, sending uplink information, or, sending uplink information and receiving downlink information.

20 Claims, 5 Drawing Sheets

(51) Int. Cl.
*H04W 4/06* (2009.01)
*H04W 4/12* (2009.01)
*H04W 24/10* (2009.01)

(58) Field of Classification Search
CPC . H04W 52/04; H04W 52/146; H04W 52/221; H04W 72/042; H04W 74/00; H04W 74/0833; H04W 74/02; H04W 74/04; H04W 74/08; H04W 28/00; H04W 76/11; H04W 76/19; H04W 48/10
See application file for complete search history.

(56) References Cited

U.S. PATENT DOCUMENTS

| | | | | |
|---|---|---|---|---|
| 2016/0142981 | A1* | 5/2016 | Yi | H04W 52/242 |
| | | | | 455/522 |
| 2016/0150570 | A1 | 5/2016 | Wang et al. | |
| 2016/0205661 | A1* | 7/2016 | Ryu | H04W 68/02 |
| | | | | 455/458 |
| 2016/0330698 | A1* | 11/2016 | Loehr | H04W 72/04 |
| 2016/0345325 | A1 | 11/2016 | Liu et al. | |
| 2016/0353440 | A1* | 12/2016 | Lee | H04W 72/0453 |
| 2017/0273113 | A1 | 9/2017 | Tirronen | |
| 2017/0359836 | A1* | 12/2017 | Kato | H04W 4/70 |
| 2018/0092062 | A1* | 3/2018 | Chen | H04W 68/00 |
| 2018/0176847 | A1* | 6/2018 | Fasil Abdul | H04L 1/189 |
| 2018/0184306 | A1 | 6/2018 | Xiong et al. | |
| 2018/0249510 | A1* | 8/2018 | Lee | H04W 74/0833 |
| 2019/0097762 | A1* | 3/2019 | Jeon | H04W 28/04 |
| 2019/0207737 | A1* | 7/2019 | Babaei | H04L 27/2607 |
| 2020/0187245 | A1* | 6/2020 | Fujishiro | H04W 74/0833 |
| 2020/0236664 | A1* | 7/2020 | You | H04L 1/0036 |
| 2020/0267803 | A1* | 8/2020 | Kwak | H04L 5/0007 |
| 2020/0314760 | A1* | 10/2020 | Ye | H04W 74/006 |
| 2020/0322992 | A1* | 10/2020 | Isogawa | H04W 74/08 |

FOREIGN PATENT DOCUMENTS

| | | |
|---|---|---|
| CN | 104812084 A | 7/2015 |
| CN | 106912109 A | 6/2017 |
| JP | 2016528791 A | 9/2016 |
| WO | 2015065947 A1 | 5/2015 |
| WO | 2016159372 A1 | 10/2016 |
| WO | 2017030485 A1 | 2/2017 |
| WO | JP2016111222 A1 | 10/2017 |

OTHER PUBLICATIONS

Chinese Office Action for related Chinese Application No. 201810023325.X; dated Sep. 18, 2020.
Sharp, "PRACH transmission for ReL-13 MTC UEs" Apr. 20-24, 2015, 3GPP TSG-RAN WG2 Meeting #89bis, Bratislava, SK.
European Search Report related to PCT Application No. PCT/CN2019070364 dated Feb. 3, 2021.
LG Electronics, (RACH procedure for MTC coverage enhancement); 3GPP TSG RAN WG1 #76; Prague, Czech Republic; Feb. 10-14, 2014; R1-140305; pp. 1-3.
Notice of Reasons for Refusal related to Application No. 2020-538702; dated Aug. 11, 2021.

* cited by examiner

METHOD FOR RECEIVING AND SENDING INFORMATION, USER EQUIPMENT AND NETWORK DEVICE

CROSS-REFERENCE TO RELATED APPLICATION

This application is the U.S. national phase of PCT Application No. PCT/CN2019/070364 filed on Jan. 4, 2019, which claims a priority to Chinese Patent Application No. 201810023325.X filed on Jan. 10, 2018 the disclosures of which are incorporated in their entirety by reference herein.

TECHNICAL FIELD

The present disclosure relates to the field of communication technology, and in particular to a method for receiving and sending information, a user equipment, and a network device.

BACKGROUND

In the 5th generation (5 Generation, 5G) mobile communication system in the future, in order to improve transmission reliability of uplink and downlink, the repetition mechanism is introduced for physical downlink shared channel (PDSCH) and physical uplink shared channel (PUSCH), that is, a data block corresponding to each PDSCH or PUSCH is repeatedly sent, and the number of repetitions can be 1, 2, 4, or 8. On the terminal side, the pieces of repeated data as received are combined and demodulated to improve the transmission reliability.

In the 5G system, in order to reduce signaling overhead, improve utilization of radio resource, and reduce energy consumption of base station, it is proposed for new radio (NR) that system information is divide into two categories, one category is minimum system information (minimum SI), and the other category is other system information (other SI). Minimum SI includes master information block (MIB) and remaining minimum system information (Remaining Minimum SI, RMSI). In addition, other SI is divided into common SI and cell specific SI according to the effective range, the former is shared among several cells and needs to be consistent, and the latter is within the range of a cell.

The minimum SI is sent to the terminal (UE) in a manner of periodic broadcast. Other SI includes all system information except minimum SI. Other SI can include multiple system information blocks (SIB) as in 4G or long term evolution (LTE). Other SI, also known as on-demand SI, is requested based on the need of the UE by the UE from the base station. In the related technologies, it is determined that the UE requests on demand SI through MSG1 or MSG3 of the random access (Random Access Channel, RACH) procedure, and it may be determined, according to the configuration of the base station or the type of SI, which of MSG1 or MSG3 is used to send the request for other SI. After the request for other SI is received by the base station, for a UE in a connected state, on demand SI may be sent to the UE through dedicated signaling, and for a UE in an idle mode or an inactive state, the corresponding on demand SI may be sent to the UE through broadcasting.

Both LTE and NR need to support the RACH procedure to achieve multiple purposes. The purpose of NR realized by supporting the RACH procedure may be: supporting initial connection of UE in idle mode to network; radio resource control (RRC) reconstruction; handover; downlink data arriving in a case of uplink out-of synchronization; uplink data arriving in a case of uplink out-of synchronization; UE changing from inactive state to active state; supporting uplink synchronization acquisition of secondary cell, etc.

RACH procedures can be divided into a contention based RACH procedure and a non-contention based RACH procedure. The contention based RACH procedure includes four-step access, from message 1 to message 4. The non-contention based RACH procedure includes two-step access, from message 1 and message 2. Each of message 2 in the contention based RACH procedure and message 2 in the non-contention based RACH procedure is sending RAR, and monitoring, by the UE, RAR of corresponding RA-RNTI, in RAR window. Due to the problem of contention based RACH procedure that UEs send the same preamble on the same PRACH resource, so after receiving message 2, a UE needs to send message 3 according to UL grant in message 2, the UE carries the identity of the UE on message 3, and a contention resolution timer is started at the same time when message 3 is sent. In a case that message 4 sent by the base station is received when the contention resolution timer does not expire, contention resolution of UE is successful. Based on the identity of the UE carried in message 4, the UE can determine whether it is its own message 4, so as to determine whether the contention is successful.

The repetition mechanism is introduced for PDSCH and PUSCH in 5G, however, for a RACH procedure of unconnected state, since the UE is not connected to the network side, the number of repetitions for uplink and downlink information in the RACH procedure cannot be clear between the UE and the network side. In the related technologies, a method for determining the number of repetitions for uplink and downlink information for an RACH procedure has not been disclosed.

SUMMARY

In a first aspect, embodiments of the present disclosure provide a method for receiving and sending information, applied to a user equipment, including:

determining the number of repetitions for an uplink channel or uplink and downlink channels of the user equipment for a random access channel (RACH) procedure; and sending uplink information in the RACH procedure by using the number of repetitions, or, sending uplink information and receiving downlink information in the RACH procedure by using the number of repetitions.

In a second aspect, embodiments of the present disclosure provide a method for receiving and sending information, applied to a network device, including:

sending a broadcast message to a user equipment, where the broadcast message is used by the user equipment to determine the number of repetitions for an uplink channel or uplink and downlink channels for an RACH procedure;

determining, according to the RACH procedure of the user equipment, the number of repetitions for the uplink and downlink channels of the user equipment for the RACH procedure; and sending downlink information and receiving uplink information, according to the number of repetitions determined according to the RACH procedure of the user equipment, in the RACH procedure.

In a third aspect, embodiments of the present disclosure provide a user equipment, including:

a first determining module, configured to determine the number of repetitions for an uplink channel or uplink and downlink channels of the user equipment for an RACH procedure; and a first receiving and sending module, configured to send uplink information in the RACH procedure by using the number of repetitions, or, send uplink information and receive downlink information in the RACH procedure by using the number of repetitions.

In a fourth aspect, embodiments of the present disclosure provide a network device, including:

a sending module, configured to send a broadcast message to a user equipment, where the broadcast message is used by the user equipment to determine the number of repetitions for an uplink channel or uplink and downlink channels for an RACH procedure;

a second determining module, configured to determine, according to the RACH procedure of the user equipment, the number of repetitions for the uplink and downlink channels of the user equipment for the RACH procedure; and a second receiving and sending module, configured to send downlink information and receive uplink information, according to the number of repetitions determined according to the RACH procedure of the user equipment, in the RACH procedure.

In a fifth aspect, embodiments of the present disclosure provide a user equipment, including a memory, a processor, and a computer program stored on the memory and executable by the processor, where, when the computer program is executed by the processor, steps of the method for receiving and sending information as described above are implemented.

In a sixth aspect, embodiments of the present disclosure provide a network device, including a memory, a processor, and a computer program stored on the memory and executable by the processor, where, when the computer program is executed by the processor, steps of the method for receiving and sending information as described above are implemented.

In a seventh aspect, embodiments of the present disclosure provide a computer readable storage medium, having a computer program stored thereon, where, when the computer program is executed by a processor, steps of the method for receiving and sending information as described above are implemented.

BRIEF DESCRIPTION OF THE DRAWINGS

In order to illustrate technical solutions of embodiments of the present disclosure more clearly, the drawings used in the descriptions of the embodiments of the present disclosure are briefly introduced hereinafter. Apparently, the drawings in the following descriptions are merely some embodiments of the present disclosure. For those skilled in the art, other drawings can be obtained based on these drawings without any creative efforts.

DETAILED DESCRIPTION

In order to illustrate technical solutions of embodiments of the present disclosure more clearly, the drawings used in the descriptions of the embodiments of the present disclosure are briefly introduced hereinafter. Apparently, the drawings in the following descriptions are merely some embodiments of the present disclosure. For those skilled in the art, other drawings can be obtained based on these drawings without any creative efforts.

Figure 1:
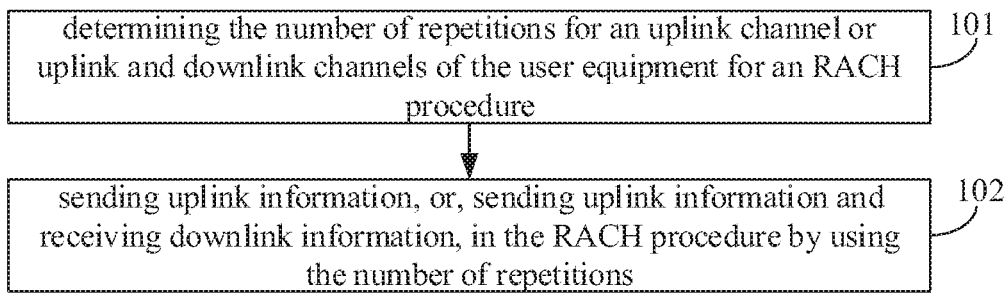
FIG. 1 is a flowchart of a method for receiving and sending information according to embodiments of the present disclosure.

Referring to FIG. 1, embodiments of the present disclosure provide a method for receiving and sending information, which is applied to a user equipment and includes the following steps.

Step 101 includes: determining the number of repetitions for an uplink channel or uplink and downlink channels of the user equipment for an RACH procedure.

It should be noted that the uplink channel of the user equipment may be a physical uplink shared channel (PUSCH), a physical uplink control channel (PUCCH), and so on. The downlink channel of the user equipment may be a physical downlink shared channel (PDSCH), a physical downlink control channel (PDCCH), and so on. The number of repetitions for the uplink channel or the downlink channel is, for example, 1, 2, 4, or 8.

Figure 2:
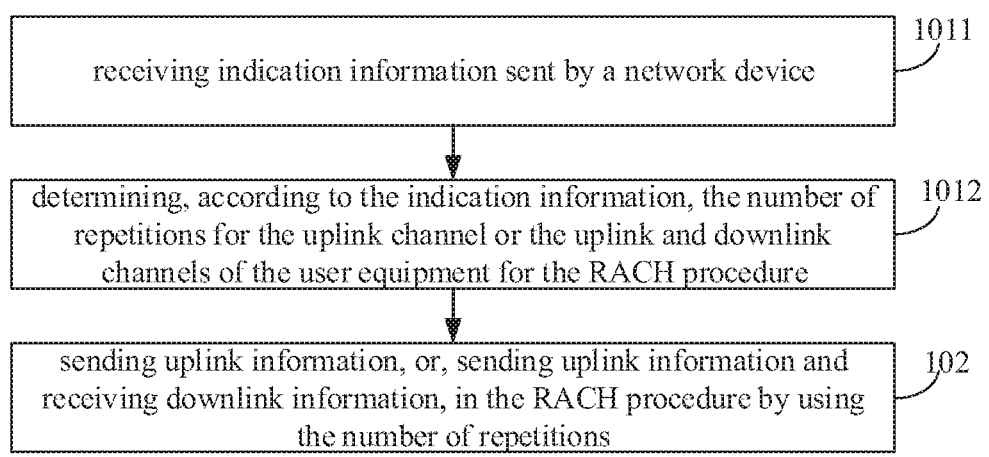
FIG. 2 is a flowchart of another method for receiving and sending information according to embodiments of the present disclosure.

When determining the number of repetitions for the uplink channel or the uplink and downlink channels of the user equipment for the RACH procedure, the user equipment may directly determine it according to indication information sent by the network side through a broadcast message. Specifically, referring to FIG. 2, step 101 may include the following steps.

Step 1011 includes: receiving indication information sent by a network device:

Step 1012 includes: determining, according to the indication information, the number of repetitions for the uplink channel or the uplink and downlink channels of the user equipment for the RACH procedure.

The indication information may be used to indicate the number of repetitions for the uplink and downlink channels of the user equipment in the RACH procedure. For example, 2-bit indication information is used to indicate the numbers of repetitions for PDSCH and PUSCH of the user equipment, and the numbers of repetitions for PUCCH and PDCCH that are possible in the future.

The indication information may include first indication information and second indication information, where the first indication information is used to indicate the number of repetitions for the uplink channel of the user equipment in the RACH procedure, and the second indication information is used to indicate the number of repetitions for the downlink channel of the user equipment in the RACH procedure. For example, 2-bit indication information is used to indicate the number of repetitions for the PDSCH (or PDCCH) of the user equipment, and 2-bit indication information is used to indicate the number of repetitions for the PUSCH (or PUCCH) of the user equipment, that is, each channel uses indication information of N bits to indicate the corresponding number of repetitions.

Further, when the network side sends the indication information through a broadcast message, the broadcast message may carry identification information of the user equipment or identification information of a group where the user equipment is located, which is for the corresponding user equipment to use the indication information in the broadcast message to determine the number of repetitions. For example, if a broadcast message received by a UE carries identification information of the UE or identification information of a group where the UE is located, the UE may use the indication information in the broadcast message to determine the corresponding number of repetitions.

Further, when the network side sends the indication information through a broadcast message, the indication information may be included in at least one of the following pieces of information of the broadcast message: a master information block (MIB), a system information block (System Information Block Type 1, SIB), remaining minimum system information (RMSI), or, other system information (OSI).

The applicable scenarios of the embodiments of the present disclosure are, for example, 5G, eLTE, or other scenarios with similar configurations.

Step 102 includes: sending uplink information in the RACH procedure by using the number of repetitions, or, sending uplink information and receiving downlink information in the RACH procedure by using the number of repetitions.

It should be noted that if the indication information in the broadcast message only indicates the number of repetitions for the uplink channel without distinguishing between the uplink and the downlink, the same number of repetitions as the uplink channel may be used to receive the downlink information or blind decoding may be performed on the downlink information. The uplink information may be an uplink control signal or uplink data, and the downlink information may be a downlink control signal or downlink data. The uplink information and the downlink information may correspond to messages of msg. 1, 2, 3, 4, or 5 in the RACH procedure.

In the method for receiving and sending information in the embodiments of the present disclosure, the number of repetitions for the uplink channel or the uplink and downlink channels of the user equipment in the RACH procedure is determined, and the number of repetitions is used to send the uplink information in the RACH procedure, or to send the uplink information and receive the downlink information. In this way, it can be clear how to determine the number of repetitions for the uplink and downlink information in the RACH procedure.

In the embodiments of the present disclosure, when determining the corresponding number of repetitions according to the indication information sent by the network side through the broadcast message, the indication information may be used to indicate the numbers of repetitions used by different preamble groups in addition to the above manner for indicating the number of repetitions, that is, indicating the number of repetitions for uplink channels or uplink and downlink channels of a user equipment using a preamble in a preamble group A and a user equipment using a preamble in a preamble group B in an RACH procedure. In the related technologies, there are groups for preambles of random access, which are preamble group A (group A) and preamble group B (group B). The group A and the group B may represent different path losses or channel conditions.

Specifically, when the indication information indicates the numbers of repetitions used by different preamble groups, separate coding or joint coding may be used. When separate coding is used, the indication information may include third indication information and fourth indication information, where the third indication information is for indicating the number of repetitions for uplink and downlink channels of a user equipment using a preamble in a preamble group A in an RACH procedure, and the fourth indication information is for indicating the number of repetitions for uplink and downlink channels of a user equipment using a preamble in a preamble group B in the RACH procedure. For example, the third indication information may be 2-bit information; when it is 0, it corresponds to 1&1 times; when it is 1, it corresponds to 2&4 times. The fourth indication information may be 2-bit information; when it is 0, it corresponds to 2&2 times; when it is 1, it corresponds to 4&8 times (where the part before "&" corresponds to the number of repetitions for the uplink channel, and the part after "&" corresponds to the number of repetitions for the downlink channel).

When separate coding is used, the indication information may include fifth indication information, sixth indication information, seventh indication information, and eighth indication information, where the fifth indication information is for indicating the number of repetitions for an uplink channel of a user equipment using a preamble in a preamble group A in an RACH procedure, the sixth indication information is for indicating the number of repetitions for a downlink channel of the user equipment using the preamble in the preamble group A in the RACH procedure, the seventh indication information is for indicating the number of repetitions for an uplink channel of a user equipment using a preamble in a preamble group B in an RACH procedure, and the eighth indication information is for indicating the number of repetitions for a downlink channel of the user equipment using the preamble in the preamble group B in the RACH procedure. For example, the fifth, sixth, seventh, and eighth indication information each may be 2-bit information.

When joint coding is used, the indication information may be used to indicate the number of repetitions for uplink and downlink channels of a user equipment using a preamble in a preamble group A in an RACH procedure, and the number of repetitions for uplink and downlink channels of a user equipment using a preamble in a preamble group B in an RACH procedure. For example, the indication information may be 1, 2, 3, or 4-bit information. When it is 3-bit information, combinations of the indicated number of repetitions may include 8 types: 1&1, 1&2, 2&2, 2&4, 2&8, 4&4, 4&8, and 8&8 (where the part before "&" corresponds to the number of repetitions for the uplink and downlink channels of the user equipment using the preamble in the preamble group A, and the part after "&" corresponds to the number of repetitions for the uplink and downlink channels of the user equipment using the preamble in the preamble group B). When it is 2-bit information, combinations of the indicated number of repetitions may include 4 types from the above 8 types, such as 1&1, 1&2, 2&4 and 4&8 which are relatively important. When it is 1-bit information, combinations of the indicated number of repetitions may include 2 types from the above 8 types, such as 2&4 and 4&8.

When joint coding is used, the indication information may include ninth indication information and tenth indication information, where the ninth indication information is for indicating the number of repetitions for an uplink channel of a user equipment using a preamble in a preamble group A in an RACH procedure, and the number of repetitions for an uplink channel of a user equipment using a preamble in a preamble group B in an RACH procedure, and the tenth indication information is for indicating the number of repetitions for a downlink channel of the user equipment using the preamble in the preamble group A in the RACH procedure, and the number of repetitions for a downlink channel of the user equipment using the preamble in the preamble group B in the RACH procedure. For example, the ninth indication information may be 1, 2, 3, or 4-bit information. When it is 3-bit information, combinations of the indicated number of repetitions may include 8 types: 1&1, 1&2, 2&2, 2&4, 2&8, 4&4, 4&8 and 8&8 (where the part before "&" corresponds to the number of repetitions for the uplink channel of the user equipment using the preamble in the preamble group A, and the part after "&" corresponds to the uplink channel of the user equipment using the preamble in the preamble group B). When it is 2-bit information, combinations of the indicated number of repetitions may include 4 types from the above 8 types, such as 1&1, 1&2, 2&4 and 4&8 which are relatively important. When it is 1-bit information, combinations of the indicated number of repetitions may include 2 types from the above 8 types, such as 2&4 and 4&8. The indication manner of the tenth indication information may be the same as the indication manner of the ninth indication information, which will not be repeated herein.

In the embodiments of the present disclosure, in order to more accurately determine the corresponding number of repetitions, the user equipment may determine the number of repetitions for the uplink channel according to a measurement performance. Specifically, referring to FIG. 3, step 101 may include the following steps.

Step 1013 includes: receiving threshold information sent by a network device, where the threshold information includes at least one measurement performance threshold for determining the number of repetitions or a level of the number of repetitions for the uplink channel of the user equipment in the RACH procedure. Levels of the number of repetitions may be divided in a manner in which the levels are in one-to-one correspondence with the numbers of repetitions, or may be divided according to groups of the numbers of repetitions. Optionally, the threshold information may be sent from the network side to the user equipment through a broadcast message or an RRC message (such as an RRC configuration message, or an RRC reconfiguration message).

Step 1014 includes: determining, according to the at least one measurement performance threshold, the number of repetitions for the uplink channel of the user equipment for the RACH procedure.

The number of repetitions determined in step 1014 may be directly determined by the user equipment according to the at least one measurement performance threshold, or determined by the user equipment according to the determined level of the number of repetitions, and the determined level of the number of repetitions is determined by the user equipment according to the at least one measurement performance threshold. The measurement performance involved in the embodiments may include: Reference Signal Receiving Power (RSRP), Reference Signal Receiving Quality (RSRQ), Signal to Interference plus Noise Ratio (SINR), Channel Quality Indicator (CQI), etc. The corresponding measurement performance threshold may be set according to actual conditions, so as to accurately determine the number of repetitions for the corresponding uplink channel according to the measurement performance threshold.

Correspondingly, step 102 includes:

sending the uplink information by using the determined number of repetitions and performing blind decoding of the downlink information, in the RACH procedure.

It should be noted that, in the embodiment, the network side does not know the number of repetitions used by the user equipment, hence, when the user equipment sends the uplink information, the network side directly performs blind decoding of the uplink control signal or the uplink data.

Further, in order to achieve synchronization of the number of repetitions used between the user equipment and the network side, on the premise of determining the number of repetitions for the uplink channel according to the measurement performance threshold, the user equipment may receive indication information sent by the network device. The indication information is used to indicate the number of repetitions for uplink channels or uplink and downlink channels of a user equipment using a preamble in a preamble group A and a user equipment using a preamble in a preamble group B in an RACH procedure, so that the user equipment selects a preamble in a preamble group corresponding to the determined number of repetitions for the uplink channel so as to perform random access, and the network side determines the number of repetitions used by the user equipment according to the preamble group where the preamble used by the user equipment is located. Specifically, based on the embodiments shown in FIG. 3 and referring to FIG. 4, before step 102, the method may further include the following steps.

Step 103 includes: receiving indication information sent by the network device, where the indication information is used to indicate the number of repetitions for uplink channels or uplink and downlink channels of a user equipment using a preamble in a preamble group A and a user equipment using a preamble in a preamble group B in an RACH procedure. Step 103 may be before or after step 1013 and step 1014.

Step 104 includes: selecting, according to the indication information, a preamble in a preamble group corresponding to the number of repetitions for the uplink channel.

Correspondingly, step 102 includes:

sending the uplink information and receiving the downlink information, in the RACH procedure, based on the selected preamble and the number of repetitions for the uplink channel.

It should be noted that in the embodiments, the network side may send the downlink information and receive the uplink information according to the determined number of repetitions used by the user equipment (with the preamble group where the preamble used by the user equipment is located). In this way, synchronization of the used number of repetitions between the user equipment and the network side can be achieved.

In the embodiments of the present disclosure, in order to achieve synchronization of the used number of repetitions between the user equipment and the network side, under the premise of determining the number of repetitions for the uplink channel according to the measurement performance threshold, the user equipment may receive PRACH resource configuration sent by the network device. The PRACH resource configuration information includes PRACH resource groups corresponding to different numbers of repetitions or levels of number of repetitions for uplink and downlink channels, so that the user equipment selects a PRACH resource corresponding to the determined number of repetitions for the uplink channel to perform random access, and the network side determines, according to the PRACH resource used by the user equipment, the number of repetitions used by the user equipment.

Optionally, the PRACH resource configuration information may be sent from the network side to the user equipment through a broadcast message or an RRC message (such as an RRC configuration message or an RRC reconfiguration message). The PRACH resources are divided according to the numbers of repetitions or levels of number of repetitions for the uplink and downlink channels, which may include preamble codeword resource, time-domain resource, frequency-domain resource, space-domain resource (beam), or, bandwidth part (BWP) resource.

Figure 3:
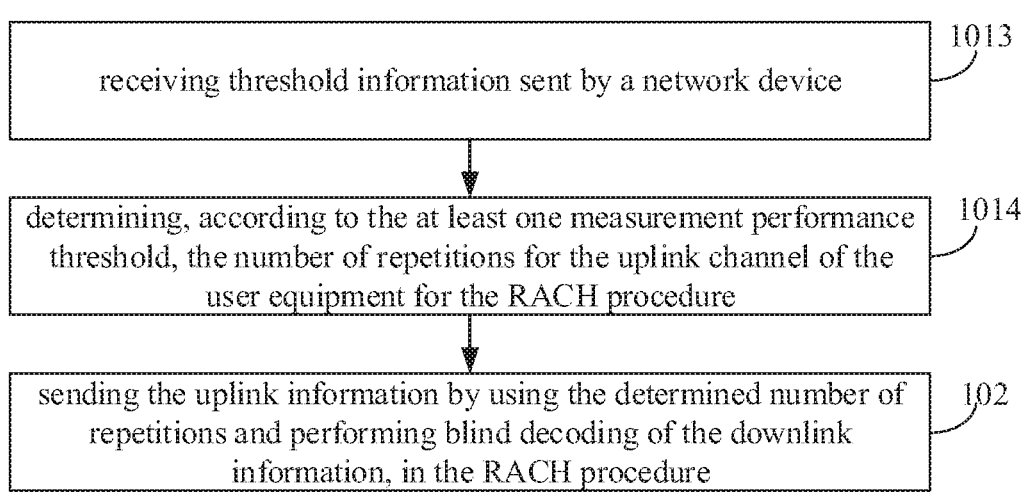
FIG. 3 is a flowchart of another method for receiving and sending information according to embodiments of the present disclosure.
Figure 4:
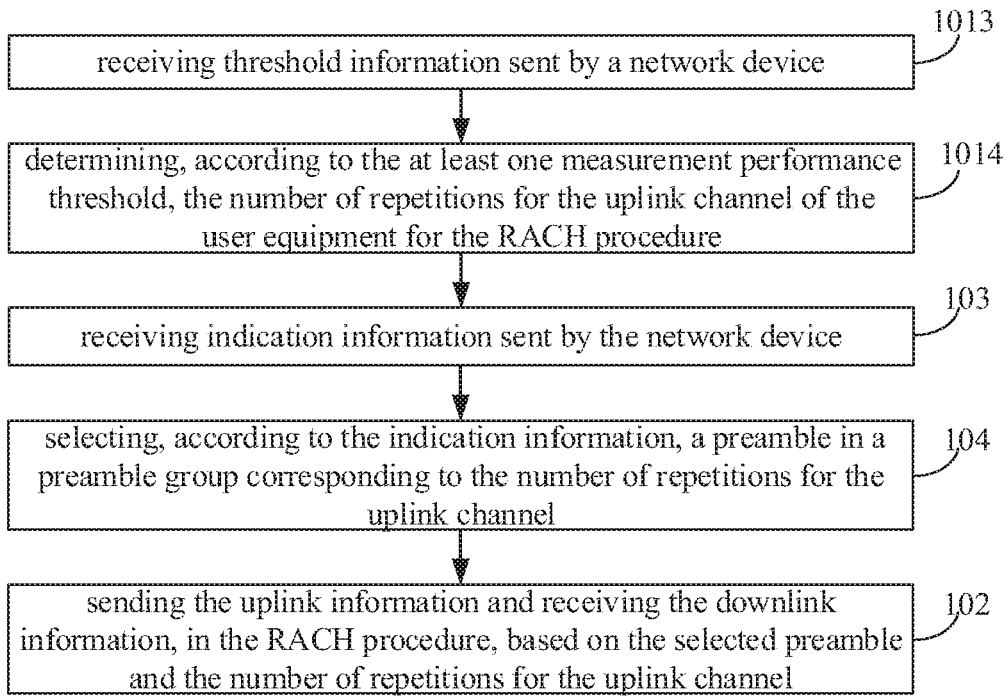
FIG. 4 is a flowchart of another method for receiving and sending information according to embodiments of the present disclosure.
Figure 5:
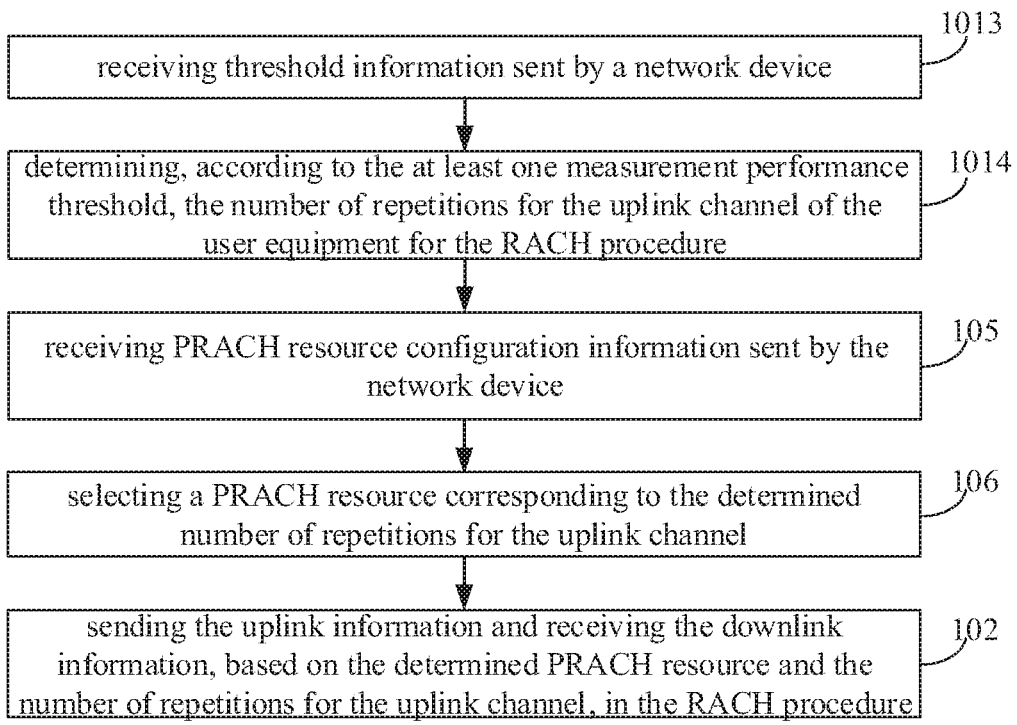
FIG. 5 is a flowchart of another method for receiving and sending information according to embodiments of the present disclosure.

Specifically, based on the embodiments shown in FIG. 3 and referring to FIG. 5, before step 102, the method may further include the following steps.

Step 105: receiving PRACH resource configuration information sent by the network device, where the PRACH resource configuration information includes PRACH resource groups corresponding to different numbers of repetitions or levels of number of repetitions for uplink and downlink channels. Step 105 may be before or after step 1013 and step 1014.

Step 106: selecting a PRACH resource corresponding to the determined number of repetitions for the uplink channel.

Correspondingly, step 102 includes:

sending the uplink information and receiving the downlink information, based on the determined PRACH resource and the number of repetitions for the uplink channel, in the RACH procedure.

It should be noted that in the embodiments, the network side may send the downlink information and receive the uplink information according to the determined number of repetitions used by the user equipment (based on the PRACH resource used by the user equipment). In this way, synchronization of the used number of repetitions between the user equipment and the network side can be achieved.

In the embodiments of the present disclosure, when the network side, such as the base station, does not broadcast the number of repetitions, the user equipment may determine a maximum number of repetitions among preset numbers of repetitions as the number of repetitions for its uplink channel in the RACH procedure. Specifically, step 101 may include:

determining, by the user equipment, a maximum number of repetitions in preset numbers of repetitions as the number of repetitions for the uplink channel of the user equipment for the RACH procedure.

Correspondingly, step 102 may include:

sending by the user equipment the uplink information by using the number of repetitions for the uplink channel and performing blind decoding of the downlink information, in the RACH procedure.

In addition, in the embodiments of the present disclosure, the user equipment may determine the number of repetitions for its uplink and downlink channels in the RACH procedure according to a preset manner. The preset manner is any one of the following manners:

the number of repetitions of the user equipment configured in a connected state before the RACH procedure;

the number of repetitions configured for the user equipment through RRC signaling before the RACH procedure, including the number of repetitions used for at least one of the following messages: msg.1, 2, 3, 4, or 5; or, a predefined or default number of repetitions, where the predefined or default number of repetitions may be agreed in the technical specification or pre-configured by the network side.

It should be noted that, if the indication information is included in the OSI of the broadcast message, then before acquiring the OSI, the preset manner in the above may be used to determine the number of repetitions for the uplink and downlink channels for the RACH procedure.

Figure 6:
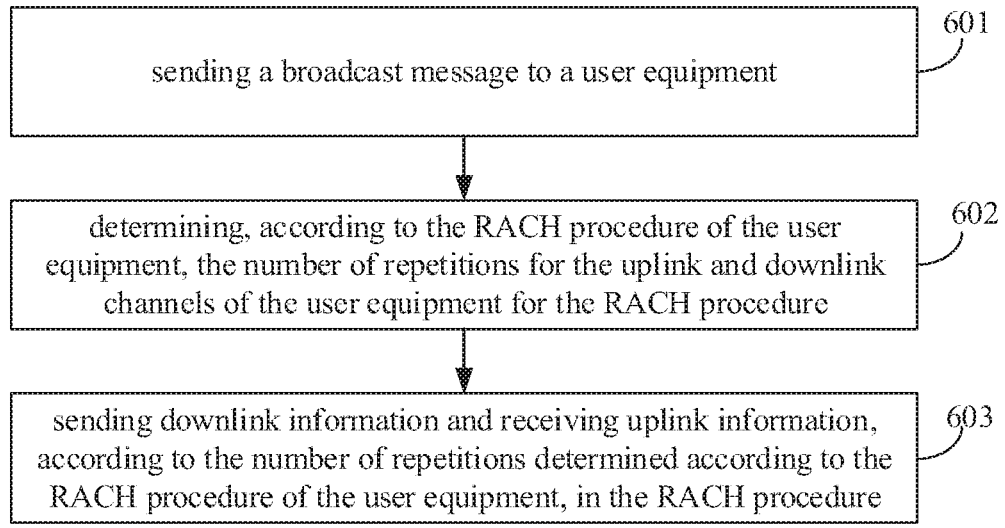
FIG. 6 is a flowchart of another method for receiving and sending information according to embodiments of the present disclosure.

Referring to FIG. 6, embodiments of the present disclosure provide a method for receiving and sending information, which is applied to a network device and includes the following steps.

Step 601: sending a broadcast message to a user equipment, where the broadcast message is used by the user equipment to determine the number of repetitions for an uplink channel or uplink and downlink channels for an RACH procedure;

Step 602: determining, according to the RACH procedure of the user equipment, the number of repetitions for the uplink and downlink channels of the user equipment for the RACH procedure; and Step 603: sending downlink information and receiving uplink information, according to the number of repetitions determined according to the RACH procedure of the user equipment, in the RACH procedure.

In the method for receiving and sending information of the embodiments of the present disclosure, the broadcast message is sent to the user equipment, the number of repetitions for the uplink and downlink channels of the user equipment in the RACH procedure is determined according to the RACH procedure of the user equipment, and the number of repetitions is used to send the downlink information and receive the uplink information in the RACH procedure. In this way, how to determine the number of repetitions for uplink and downlink information in the RACH procedure can be clear.

Optionally, the broadcast message includes indication information, the indication information is for indicating the number of repetitions for uplink channels or uplink and downlink channels of a user equipment using a preamble in a preamble group A and a user equipment using a preamble in a preamble group B for an RACH procedure, the threshold information includes at least one measurement performance threshold for determining the number of repetitions or a level of the number of repetitions for the uplink channel of the user equipment for the RACH procedure. Step 602 may include:

determining, according to a preamble group where a preamble used by the user equipment in the RACH procedure is located, the number of repetitions for the uplink and downlink channels of the user equipment for the RACH procedure.

Further, on the basis of including the indication information, the broadcast message may further include threshold information, and the threshold information includes at least one measurement performance threshold for determining the number of repetitions or a level of the number of repetitions for the uplink channel of the user equipment for the RACH procedure.

Optionally, the broadcast message includes threshold information and PRACH resource configuration information, the threshold information includes at least one measurement performance threshold for determining the number of repetitions or a level of the number of repetitions for the uplink channel of the user equipment for the RACH procedure, and the PRACH resource configuration information includes PRACH resource groups corresponding to different numbers of repetitions or levels of number of repetitions for uplink and downlink channels. Step 602 may include:

determining, according to a PRACH resource used by the user equipment in the RACH procedure, the number of repetitions for the uplink and downlink channels of the user equipment for the RACH procedure, where the number of repetitions is directly determined by the network device according to the PRACH resource used by the user equipment, or is determined by the network device according to the determined level of the number of repetitions, and the determined level of the number of repetitions is determined by the network device according to the PRACH resource used by the user equipment.

The above embodiments describe the method for receiving and sending information of the present disclosure, and the user equipment and the network device of the present disclosure will be described hereinafter in conjunction with embodiments and drawings.

Figure 7:
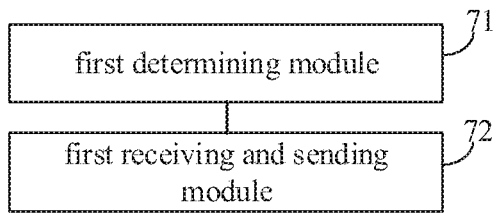
FIG. 7 is a schematic structural diagram of a user equipment according to embodiments of the present disclosure.

Referring to FIG. 7, embodiments of the present disclosure provide a user equipment. The user equipment includes:

a first determining module 71, configured to determine the number of repetitions for an uplink channel or uplink and downlink channels of the user equipment for an RACH procedure; and a first receiving and sending module 72, configured to send uplink information in the RACH procedure by using the number of repetitions, or, send uplink information and receive downlink information in the RACH procedure by using the number of repetitions.

Based on the user equipment of the embodiments of the present disclosure, the number of repetitions for the uplink channel or the uplink and downlink channels of the user equipment in the RACH procedure is determined, and the number of repetitions is used to send the uplink information in the RACH procedure, or to send the uplink information and receive the downlink information. In this way, it can be clear how to determine the number of repetitions for the uplink and downlink information in the RACH procedure.

Figure 8:
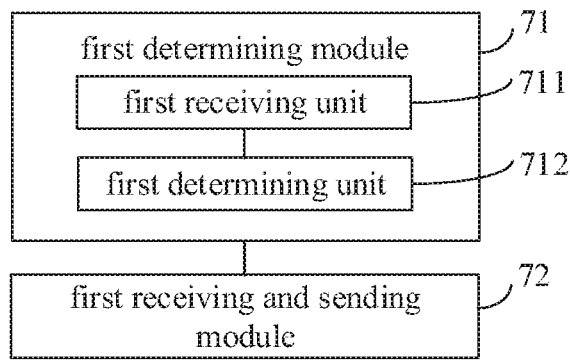
FIG. 8 is a second structural diagram of a user equipment according to embodiments of the present disclosure.

Optionally, referring to FIG. 8, the first determining module 71 includes:

a first receiving unit 711, configured to receive indication information sent by the network device; and a first determining unit 712, configured to determine, according to the indication information, the number of repetitions for the uplink channel or the uplink and downlink channels of the user equipment for the RACH procedure.

Optionally, the indication information is used to indicate the number of repetitions for the uplink and downlink channels of the user equipment in the RACH procedure; or the indication information includes first indication information and second indication information, where the first indication information is used to indicate the number of repetitions for the uplink channel of the user equipment in the RACH procedure, and the second indication information is used to indicate the number of repetitions for the downlink channel of the user equipment in the RACH procedure.

Optionally, the first receiving unit 711 is configured to:

receive, through a broadcast message, the indication information sent by the network device, where the broadcast message carries identification information of the user equipment or identification information of a group where the user equipment is located, for the corresponding user equipment to use the indication information in the broadcast message to determine the number of repetitions.

Figure 9:
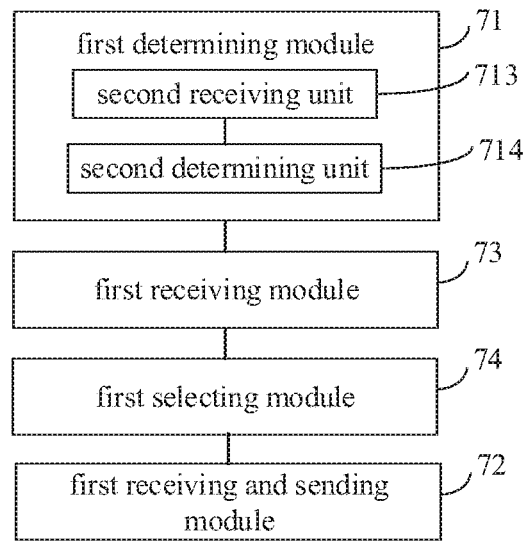
FIG. 9 is a third schematic structural diagram of a user equipment according to embodiments of the present disclosure.

Optionally, referring to FIG. 9, the first determining module 71 includes:

a second receiving unit 713, configured to receive threshold information sent by a network device, wherein the threshold information includes at least one measurement performance threshold for determining the number of repetitions or a level of the number of repetitions for the uplink channel of the user equipment for the RACH procedure; and a second determining unit 714, configured to determine, according to the at least one measurement performance threshold, the number of repetitions for the uplink channel of the user equipment for the RACH procedure; and the number of repetitions is directly determined by the user equipment according to the at least one measurement performance threshold, or is determined by the user equipment according to the determined level of the number of repetitions, and the determined level of the number of repetitions is determined by the user equipment according to the at least one measurement performance threshold.

Optionally, the first receiving and sending module 72 is configured to:

send the uplink information by using the number of repetitions and perform blind decoding of the downlink information, in the RACH procedure.

Optionally, referring to FIG. 9, the user equipment further includes:

a first receiving module 73, configured to receive indication information sent by the network device, wherein the indication information is for indicating the number of repetitions for uplink channels or uplink and downlink channels of a user equipment using a preamble in a preamble group A and a user equipment using a preamble in a preamble group B for an RACH procedure; and a first selecting module 74, configured to select, according to the indication information, a preamble in a preamble group corresponding to the number of repetitions for the uplink channel;

the first receiving and sending module 72 is configured to:

send the uplink information and receiving the downlink information, in the RACH procedure, based on the selected preamble and the number of repetitions for the uplink channel.

Optionally, the indication information includes third indication information and fourth indication information, where the third indication information is for indicating the number of repetitions for uplink and downlink channels of a user equipment using a preamble in a preamble group A in an RACH procedure, and the fourth indication information is for indicating the number of repetitions for uplink and downlink channels of a user equipment using a preamble in a preamble group B in the RACH procedure; or the indication information includes fifth indication information, sixth indication information, seventh indication information, and eighth indication information, where the fifth indication information is for indicating the number of repetitions for an uplink channel of a user equipment using a preamble in a preamble group A in an RACH procedure, the sixth indication information is for indicating the number of repetitions for a downlink channel of the user equipment using the preamble in the preamble group A in the RACH procedure, the seventh indication information is for indicating the number of repetitions for an uplink channel of a user equipment using a preamble in a preamble group B in an RACH procedure, and the eighth indication information is for indicating the number of repetitions for a downlink channel of the user equipment using the preamble in the preamble group B in the RACH procedure; or the indication information is used to indicate the number of repetitions for uplink and downlink channels of a user equipment using a preamble in a preamble group A in an RACH procedure, and the number of repetitions for uplink and downlink channels of a user equipment using a preamble in a preamble group B in an RACH procedure; or the indication information includes ninth indication information and tenth indication information, where the ninth indication information is for indicating the number of repetitions for an uplink channel of a user equipment using a preamble in a preamble group A in an RACH procedure, and the number of repetitions for an uplink channel of a user equipment using a preamble in a preamble group B in an RACH procedure, and the tenth indication information is for indicating the number of repetitions for a downlink channel of the user equipment using the preamble in the preamble group A in the RACH procedure, and the number of repetitions for a downlink channel of the user equipment using the preamble in the preamble group B in the RACH procedure.

Figure 10:
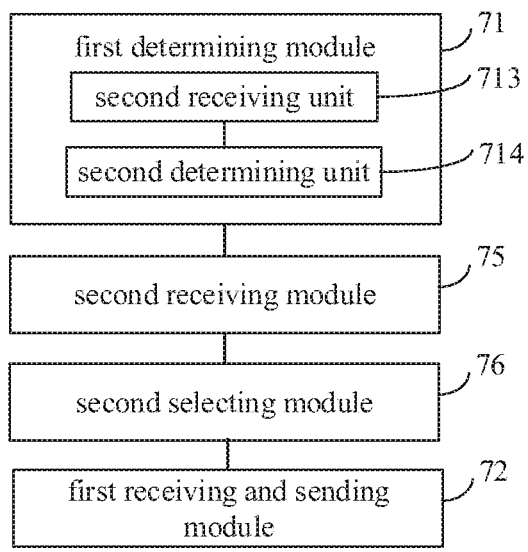
FIG. 10 is a fourth schematic structural diagram of a user equipment according to embodiments of the present disclosure.

Optionally, referring to FIG. 10, the user equipment further includes:

a second receiving module 75, configured to receive PRACH resource configuration information sent by the network device, wherein the PRACH resource configuration information includes PRACH resource groups corresponding to different numbers of repetitions or levels of number of repetitions for uplink and downlink channels; and a second selecting module 76, configured to select a PRACH resource corresponding to the determined number of repetitions for the uplink channel;

the first receiving and sending module 72 is configured to:

send the uplink information and receive the downlink information, based on the determined PRACH resource and the number of repetitions for the uplink channel, in the RACH procedure.

Optionally, the first receiving unit or the first receiving module is configured to:

receive, through a broadcast message, the indication information sent by the network device.

Optionally, the indication information is included in at least one of the following pieces of information of the broadcast message: a master information block (MIB), a system information block (System Information Block Type 1, SIB1), remaining minimum system information (RMSI), or, other system information (OSI).

Optionally, the first determining module 71 is configured to:

determine a maximum number of repetitions in preset numbers of repetitions as the number of repetitions for the uplink channel of the user equipment for the RACH procedure.

Optionally, the first determining module 71 is configured to:

determine the number of repetitions for the uplink and downlink channels of the UE in the RACH procedure according to a preset manner. The preset manner is any one of the following manners:

the number of repetitions of the user equipment configured in a connected state before the RACH procedure;

the number of repetitions configured for the user equipment through RRC signaling before the RACH procedure; or, a predefined or default number of repetitions.

Figure 11:
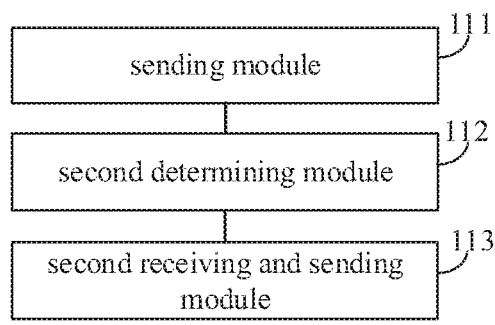
FIG. 11 is a schematic structural diagrams of a network device according to embodiments of the present disclosure.

Referring to FIG. 11, embodiments of the present disclosure provide a network device, including:

a sending module 111, configured to send a broadcast message to a user equipment, where the broadcast message is used by the user equipment to determine the number of repetitions for an uplink channel or uplink and downlink channels for an RACH procedure;

a second determining module 112, configured to determine, according to the RACH procedure of the user equipment, the number of repetitions for the uplink and downlink channels of the user equipment for the RACH procedure; and a second receiving and sending module 113, configured to send downlink information and receive uplink information, according to the number of repetitions determined according to the RACH procedure of the user equipment, in the RACH procedure.

Based on the network device of the embodiments of the present disclosure, the broadcast message is sent to the user equipment, the number of repetitions for the uplink and downlink channels of the user equipment in the RACH procedure is determined according to the RACH procedure of the user equipment, and the number of repetitions is used to send the downlink information and receive the uplink information in the RACH procedure. In this way, how to determine the number of repetitions for uplink and downlink information in the RACH procedure can be clear.

Optionally, the broadcast message includes indication information, and the indication information is for indicating the number of repetitions for uplink channels or uplink and downlink channels of a user equipment using a preamble in a preamble group A and a user equipment using a preamble in a preamble group B for an RACH procedure; and the second determining module 112 is configured to:

determine, according to a preamble group where a preamble used by the user equipment in the RACH procedure is located, the number of repetitions for the uplink and downlink channels of the user equipment for the RACH procedure.

Further, on the basis of including the indication information, the broadcast message may further include threshold information, and the threshold information includes at least one measurement performance threshold for determining the number of repetitions or a level of the number of repetitions for the uplink channel of the user equipment for the RACH procedure.

Optionally, the broadcast message includes threshold information and PRACH resource configuration information, the threshold information includes at least one measurement performance threshold for determining the number of repetitions or a level of the number of repetitions for the uplink channel of the user equipment for the RACH procedure, and the PRACH resource configuration information includes PRACH resource groups corresponding to different numbers of repetitions or levels of number of repetitions for uplink and downlink channels; the second determining module 112 is configured to:

determine, according to a PRACH resource used by the user equipment in the RACH procedure, the number of repetitions for the uplink and downlink channels of the user equipment for the RACH procedure;

where the number of repetitions is directly determined by the network device according to the PRACH resource used by the user equipment, or is determined by the network device according to the determined level of the number of repetitions, and the determined level of the number of repetitions is determined by the network device according to the PRACH resource used by the user equipment.

Embodiments of the present disclosure provide a user equipment, including a processor, a memory, and a computer program stored on the memory and executable by the processor, when the computer program is executed by the processor, various processes of the above method embodiments for receiving and sending information are implemented, achieving the same technical effect, which are not repeated herein so as to avoid repetition.

Figure 12:
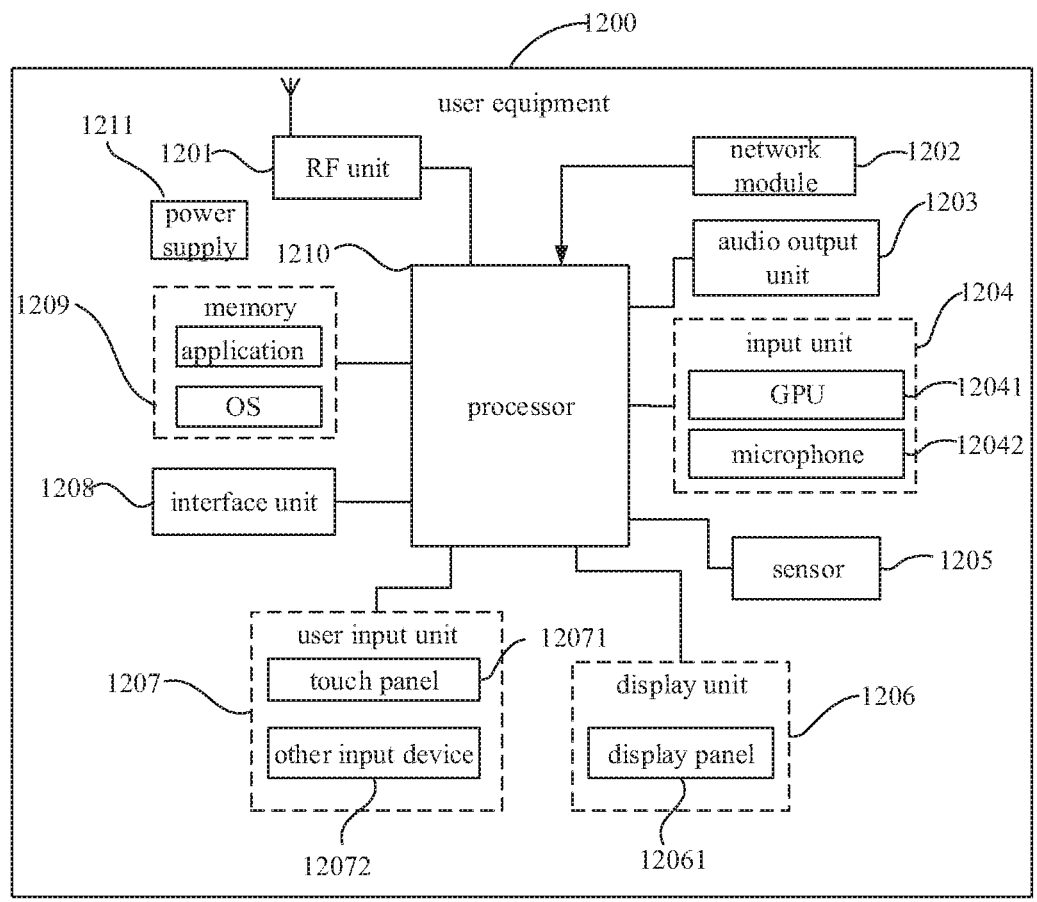
FIG. 12 is a fifth schematic structural diagram of a user equipment according to embodiments of the present disclosure.

Specifically, FIG. 12 is a schematic diagram of a hardware structure of a user equipment for implementing various embodiments of the present disclosure. The user equipment 1200 includes, but is not limited to, a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211, etc. Those skilled in the art can understand that the structure of the user equipment shown in FIG. 12 does not constitute a limitation to the user equipment, and the user equipment may include more or fewer components than those shown in the figure, or have some components combined, or use a different arrangement of the components. In the embodiments of the present disclosure, the user equipment includes, but is not limited to, a mobile phone, a tablet computer, a notebook computer, a palmtop computer, a vehicle-mounted terminal, a wearable device, a pedometer, or the like.

The processor 1210 is configured to determine the number of repetitions for an uplink channel or uplink and downlink channels of the user equipment for an RACH procedure.

The radio frequency unit 1201 is configured to send uplink information in the RACH procedure by using the number of repetitions, or, send uplink information and receive downlink information in the RACH procedure by using the number of repetitions.

Based on user equipment 1200 of the embodiments of the present disclosure, the number of repetitions for the uplink channel or the uplink and downlink channels of the user equipment in the RACH procedure is determined, and the number of repetitions is used to send the uplink information in the RACH procedure, or to send the uplink information and receive the downlink information. In this way, it can be clear how to determine the number of repetitions for the uplink and downlink information in the RACH procedure.

It should be understood that, in the embodiments of the present disclosure, the radio frequency unit 1201 may be configured to receive and send information, or to receive and send signals in a call. Specifically, the radio frequency unit 1201 delivers the downlink data received from a base station to the processor 1210; and transmits the uplink data to the base station. Generally, the radio frequency unit 1201 includes, but is not limited to, an antenna, at least one amplifier, a transceiver, a coupler, a low noise amplifier, a duplexer, or the like. In addition, the radio frequency unit 1201 may communicate with a network or other devices via a wireless communication system.

The user equipment provides users with wireless broadband Internet access via the network module 1202, such as helping users send and receive emails, browse web pages and access streaming media.

The audio output unit 1203 may convert audio data received by the radio frequency unit 1201 or the network module 1202 or stored in the memory 1209 into audio signals and output them as sound. Moreover, the audio output unit 1203 may provide audio output (for example, call signal reception sound, message reception sound, etc.) related to a specific function performed by the user equipment 1200. The audio output unit 1203 includes a speaker, a buzzer, a receiver, or the like.

The input unit 1204 is configured to receive audio or video signals. The input unit 1204 may include a graphics processing unit (GPU) 12041 and a microphone 12042. The graphics processor 12041 is configured to process image data of still pictures or videos obtained via an image capture device (such as a camera) in an image capture mode or a video capture mode. The processed image frames may be displayed on the display unit 1206. The image frames processed by the graphics processor 12041 may be stored in the memory 1209 (or other storage medium) or transmitted via the radio frequency unit 1201 or the network module 1202. The microphone 12042 may receive sound, and may process the sound into audio data. The processed audio data may be converted into a format that can be transmitted to a mobile communication base station for outputting via the radio frequency unit 1201 in the case of a telephone call mode.

The user equipment 1200 further includes at least one sensor 1205, such as an optical sensor, a motion sensor, or other sensors. Specifically, the optical sensor includes an ambient light sensor and a proximity sensor. The ambient light sensor may adjust brightness of the display panel 12061 according to the brightness of the ambient light, and the proximity sensor may close the display panel 12061 and/or backlight when the user equipment 1200 approaches to the ear. As a type of motion sensor, an accelerometer sensor may detect the magnitude of acceleration in various directions (usually three-axis directions), and detect the magnitude and direction of gravity when in the stationary state. The accelerometer sensor may be applied to identify the pose of the user equipment (such as switching of horizontal and vertical screen, a correlated game, magnetometer pose calibration), a function about vibration recognition (such as pedometer, tapping). The sensor 1205 may also include a fingerprint sensor, a pressure sensor, an iris sensor, a molecular sensor, a gyroscope, a barometer, a hygrometer, a thermometer, an infrared sensor, or the like, which are not described herein.

The display unit 1206 is configured to display information input by the user or information provided for the user. The display unit 1206 may include a display panel 12061. The display panel 12061 may be configured in the form of a liquid crystal display (LCD), an organic light-emitting diode (OLED), or the like.

The user input unit 1207 may be configured to receive inputted numeric or character information, and generate key signal inputs related to user settings and function control of the user equipment. Specifically, the user input unit 1207 includes a touch panel 12071 and other input device 12072. The touch panel 12071, also known as a touch screen, may collect a touch operation of a user thereon or thereby (for example, an operation on or around the touch panel 12071 that is made by a user with a finger, a touch pen or any other suitable object or accessory). The touch panel 12071 may include two parts: a touch detection device and a touch controller. The touch detection device detects touch orientation of the user, detects a signal caused by the touch operation, and transmits the signal to the touch controller. The touch controller receives touch information from the touch detection device, converts the touch information into contact coordinates, and transmits the contact coordinates to the processor 1210. The touch controller may receive a command from the processor 1210 and executes the command. In addition, the touch panel 12071 may be implemented by various types such as a resistive panel, a capacitive panel, an infrared panel, or a surface acoustic wave panel. In addition to the touch panel 12071, the user input unit 1207 may include other input device 12072. Specifically, the other input device 12072 may include, but is not limited to, a physical keyboard, a function key (such as a volume control key, a switch key), a trackball, a mouse, or a joystick, which are not described herein.

Further, the display panel 12061 may be covered by the touch panel 12071. When the touch panel 12071 detects a touch operation on or near the touch panel 12071, the touch panel 12071 transmits the touch operation to the processor 1210 to determine the type of the touch event, and the processor 1210 provides a corresponding visual output on the display panel 12061 according to the type of touch event. Although the touch panel 12071 and the display panel 12061 are implemented as two independent components to implement the input and output functions of the user equipment in FIG. 12, in some embodiments, the touch panel 12071 and the display panel 12061 may be integrated to implement the input and output functions of the user equipment, which are not limited herein.

The interface unit 1208 is an interface through which an external device is connected to the user equipment 1200. For example, the external device may include a wired or wireless headset port, an external power (or battery charger) port, a wired or wireless data port, a memory card port, a port for connecting a device with an identity module, an audio input/output (I/O) port, a video I/O port, a headphone port, etc. The interface unit 1208 may be configured to receive input (e.g., data information, power, etc.) from an external device and transmit the received input to one or more elements in the user equipment 1200 or may be configured to transmit data between the user equipment 1200 and the external device.

The memory 1209 may be configured to store software programs and various data. The memory 1209 may mainly include a program storage area and a data storage area, where the program storage area may store an operating system, an application (such as a sound playback function, an image playback function, etc.) required for at least one function; the data storage area may store data (such as audio data, a phone book, etc.) created according to the use of the mobile phone. In addition, the memory 1209 may include a high-speed random access memory, and may further include a non-volatile memory, such as at least one magnetic disk storage device, a flash memory device, or other volatile solid-state storage device.

The processor 1210 is a control center of the user equipment, which uses various interfaces and lines to connect various parts of the entire user equipment. The processor 1210 runs or executes software programs and/or modules stored in the memory 1209 and calls data stored in the memory 1209, to execute various functions of the user equipment and process data, so as to monitor the user equipment as a whole. The processor 1210 may include one or more processing units. Optionally, the processor 1210 may integrate an application processor and a modem processor. The application processor mainly processes an operating system, a user interface, an application, etc., and the modem processor mainly processes wireless communications. It can be understood that the foregoing modem processor may not be integrated into the processor 1210.

The user equipment 1200 may further include a power supply 1211 (such as a battery) for supplying power to various components. Optionally, the power supply 1211 may be logically connected to the processor 1210 through a power management system, so as to implement functions, such as management of charging and discharging, and power consumption management, via the power management system.

In addition, the user equipment 1200 may include some functional modules that are not shown, which are not described herein.

Embodiments of the present disclosure also provide a network device, including a processor, a memory, and a computer program stored on the memory and executable by the processor, when the computer program is executed by the processor, various processes of the above method embodiments for receiving and sending information are implemented, achieving the same technical effect, which are not repeated herein so as to avoid repetition.

Figure 13:
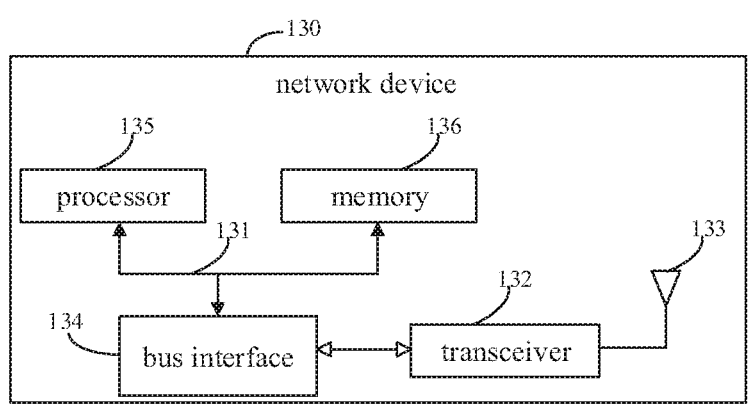
FIG. 13 is a second structural diagram of a network device according to embodiments of the present disclosure.

Specifically, FIG. 13 is a schematic diagram of a hardware structure of a network device that implements various embodiments of the present disclosure. The network device 130 includes, but is not limited to: a bus 131, a transceiver 132, an antenna 133, a bus interface 134, a processor 135, and a memory 136.

In the embodiments of the present disclosure, the network device 130 further includes: a computer program stored on the memory 136 and executable by the processor 135. When the computer program is executed by the processor 135, the following steps are implemented:

sending a broadcast message to a user equipment, where the broadcast message is used by the user equipment to determine the number of repetitions for an uplink channel or uplink and downlink channels for an RACH procedure;

determining, according to the RACH procedure of the user equipment, the number of repetitions for the uplink and downlink channels of the user equipment for the RACH procedure; and sending downlink information and receiving uplink information, according to the number of repetitions determined according to the RACH procedure of the user equipment, in the RACH procedure.

The transceiver 132 is configured to receive and transmit data under the control of the processor 135.

In FIG. 13, the bus architecture (represented by bus 131) may include any quantity of interconnected buses and bridges, and various circuits such as one or more processors represented by the processor 135 and memory represented by the memory 136 are connected to each other via the bus 131. The bus 131 may connect a variety of other circuits such as peripherals, voltage regulators and power management circuits to each other, which is well known in the art, thus no further description thereof will be given herein. The bus interface 134 provides an interface between the bus 131 and the transceiver 132. The transceiver 132 may be one component or may include multiple components, i.e., multiple receivers and transmitters, which are used to provide a unit for communicating with other devices via a transmission medium. The data processed by the processor 135 is transmitted on a radio medium via the antenna 133. Further, the antenna 133 receives data and transmits the data to the processor 135.

The processor 135 is responsible for managing the bus 131 and common processing, and may provide various functions, including timing, peripheral interface, voltage regulation, power management, and other control functions. The memory 136 may be configured to store data used by the processor 135 when performing operations.

Optionally, the processor 135 may be a CPU, an ASIC, an FPGA, or a CPLD.

Embodiments of the present disclosure further provide a computer readable storage medium. A computer program is stored on the computer readable storage medium. When the computer program is executed by a processor, various processes of the embodiments of the above method for receiving and sending information are implemented, which can achieve the same technical effects. To avoid repetition, details are not described herein. The computer readable storage medium is, for example, a read-only memory (ROM), a random access memory (RAM), a magnetic disk or an optical disk.

It should be noted that, in the present disclosure, the terms "include", "have" or any other variants thereof are meant to cover non-exclusive inclusion, so that a process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

Through the descriptions of the above embodiments, those skilled in the art can clearly understand that the methods in the above embodiments may be implemented by means of software plus a necessary universal hardware platform, and also may be implemented by hardware, but in many cases the former is preferred. Based on this understanding, the technical solution of the present disclosure that is essentially or contributes to the related technologies may be embodied in the form of a software product that is stored in a storage medium (such as a ROM/RAM, a magnetic disk, or an optical disc), which includes several instructions for enabling a terminal (which may be a mobile phone, a computer, a server, an air conditioner, or a network device) to execute the method described in the embodiments of the present disclosure.

The embodiments of the present disclosure are described in the above with reference to the drawings, and the present disclosure is not limited to the above specific implementations. The above specific implementations are illustrative rather than restrictive. Various forms can be made by those of ordinary skill in the art under the inspiration of the present disclosure, without departing from the purpose of the present disclosure and the protection scope of the claims, all of which fall within the protection of the present disclosure.

What is claimed is:

1. A method for receiving and sending information, applied to a user equipment, comprising:
    determining the number of repetitions for an uplink channel or uplink and downlink channels of the user equipment for a random access channel (RACH) procedure; and
    sending uplink information in the RACH procedure by using the number of repetitions, or, sending uplink information and receiving downlink information in the RACH procedure by using the number of repetitions;
    wherein the determining the number of repetitions for the uplink channel or the uplink and downlink channels of the user equipment for the RACH procedure comprises:
    receiving threshold information sent by a network device, wherein the threshold information comprises at least one measurement performance threshold for determining the number of repetitions or a level of the number of repetitions for the uplink channel of the user equipment for the RACH procedure; and
    determining, according to the at least one measurement performance threshold, the number of repetitions for the uplink channel of the user equipment for the RACH procedure;
    wherein the number of repetitions is directly determined by the user equipment according to the at least one measurement performance threshold, or is determined by the user equipment according to the determined level of the number of repetitions, and the determined level of the number of repetitions is determined by the user equipment according to the at least one measurement performance threshold.

2. The method according to claim 1, wherein the sending the uplink information in the RACH procedure by using the number of repetitions, or, sending the uplink information and receiving the downlink information in the RACH procedure by using the number of repetitions comprises: sending the uplink information by using the number of repetitions and performing blind decoding of the downlink information, in the RACH procedure.

3. The method according to claim 1, wherein before the sending the uplink information in the RACH procedure by using the number of repetitions, or, sending the uplink information and receiving the downlink information in the RACH procedure by using the number of repetitions, the method further comprises:
    receiving indication information sent by the network device, wherein the indication information is for indicating the number of repetitions for uplink channels or uplink and downlink channels of a user equipment using a preamble in a preamble group A and a user equipment using a preamble in a preamble group B for an RACH procedure; and
    selecting, according to the indication information, a preamble in a preamble group corresponding to the number of repetitions for the uplink channel; and
    wherein the sending the uplink information in the RACH procedure by using the number of repetitions, or, sending the uplink information and receiving the downlink information in the RACH procedure by using the number of repetitions comprises: sending the uplink information and receiving the downlink information, in the RACH procedure, based on the selected preamble and the number of repetitions for the uplink channel.

4. The method according to claim 3, wherein,
    the indication information comprises third indication information and fourth indication information, the third indication information is for indicating the number of repetitions for uplink and downlink channels of a user equipment using a preamble in a preamble group A for an RACH procedure, and the fourth indication information is for indicating the number of repetitions for uplink and downlink channels of a user equipment using a preamble in a preamble group B for an RACH procedure; or, the indication information comprises fifth indication information, sixth indication information, seventh indication information, and eighth indication information, the fifth indication information is for indicating the number of repetitions for an uplink channel of a user equipment using a preamble in a preamble group A for an RACH procedure, the sixth indication information is for indicating the number of repetitions for a downlink channel of the user equipment using the preamble in the preamble group A for the RACH procedure, the seventh indication information is for indicating the number of repetitions for an uplink channel of a user equipment using a preamble in a preamble group B for an RACH procedure, and the eighth indication information is for indicating the number of repetitions for a downlink channel of the user equipment using the preamble in the preamble group B for the RACH procedure; or, the indication information is for indicating the number of repetitions for uplink and downlink channels of a user equipment using a preamble in a preamble group A for an RACH procedure, and the number of repetitions for uplink and downlink channels of a user equipment using a preamble in a preamble group B for an RACH procedure; or, the indication information comprises ninth indication information and tenth indication information, the ninth indication information is for indicating the number of repetitions for an uplink channel of a user equipment using a preamble in a preamble group A for an RACH procedure, and the number of repetitions for an uplink channel of a user equipment using a preamble in a preamble group B for an RACH procedure, and the tenth indication information is for indicating the number of repetitions for a downlink channel of the user equipment using the preamble in the preamble group A for the RACH procedure, and the number of repetitions for a downlink channel of the user equipment using the preamble in the preamble group B for the RACH procedure.

5. The method according to claim 3, wherein the receiving the indication information sent by the network device comprises: receiving, through a broadcast message, the indication information sent by the network device.

6. The method according to claim 5, wherein the indication information is included in at least one of the following pieces of information of the broadcast message: a master information block (MIB), a system information block type 1 (SIB1), remaining minimum system information (RMSI), or, other system information (OSI).

7. The method according to claim 1, wherein before the sending the uplink information in the RACH procedure by using the number of repetitions, or, sending the uplink information and receiving the downlink information in the RACH procedure by using the number of repetitions, the method further comprises:
receiving physical random access channel (PRACH) resource configuration information sent by the network device, wherein the PRACH resource configuration information comprises PRACH resource groups corresponding to different numbers of repetitions or levels of number of repetitions for uplink and downlink channels; and
selecting a PRACH resource corresponding to the determined number of repetitions for the uplink channel; and
wherein the sending the uplink information in the RACH procedure by using the number of repetitions, or, sending the uplink information and receiving the downlink information in the RACH procedure by using the number of repetitions comprises: sending the uplink information and receiving the downlink information, based on the determined PRACH resource and the number of repetitions for the uplink channel, in the RACH procedure.

8. A method for receiving and sending information, applied to a network device, comprising:
sending a broadcast message to a user equipment, wherein the broadcast message is used by the user equipment to determine the number of repetitions for an uplink channel or uplink and downlink channels for an RACH procedure;
determining, according to the RACH procedure of the user equipment, the number of repetitions for the uplink and downlink channels of the user equipment for the RACH procedure; and
sending downlink information and receiving uplink information, according to the number of repetitions determined according to the RACE procedure of the user equipment, in the RACH procedure;
wherein the broadcast message comprises threshold information, and the threshold information comprises at least one measurement performance threshold for determining the number of repetitions or a level of the number of repetitions for the uplink channel of the user equipment for the RACH procedure.

9. The method according to claim 8, wherein the broadcast message comprises indication information, the indication information is for indicating the number of repetitions for uplink channels or uplink and downlink channels of a user equipment using a preamble in a preamble group A and a user equipment using a preamble in a preamble group B for an RACH procedure; and
wherein the determining, according to the RACH procedure of the user equipment, the number of repetitions for the uplink and downlink channels of the user equipment in the RAM procedure comprises: determining, according to a preamble group where a preamble used by the user equipment in the RACH procedure is located, the number of repetitions for the uplink and downlink channels of the user equipment for the RACH procedure.

10. The method according to claim 8, wherein the broadcast message comprises PRACH resource configuration information, and the PRACH resource configuration information comprises PRACH resource groups corresponding to different numbers of repetitions or levels of number of repetitions for uplink and downlink channels;
wherein the determining, according to the RACH procedure of the user equipment, the number of repetitions for the uplink and downlink channels of the user equipment for the RACH procedure comprises: determining, according to a PRACH resource used by the user equipment in the RACH procedure, the number of repetitions for the uplink and downlink channels of the user equipment for the RACH procedure; and
wherein, the number of repetitions is directly determined by the network device according to the PRACH resource used by the user equipment, or is determined by the network device according to the determined level of the number of repetitions, and the determined level of the number of repetitions is determined by the network device according to the PRACH resource used by the user equipment.

11. A network device, comprising a memory, a processor, and a program stored on the memory and executable by the processor, wherein, when the program is executed by the processor, steps of the method for receiving and sending information according to claim 8 are implemented.

12. The network device according to claim 11, wherein the broadcast message comprises indication information, and the indication information is for indicating the number of repetitions for uplink channels or uplink and downlink channels of a user equipment using a preamble in a preamble group A and a user equipment using a preamble in a preamble group B for an RACH procedure; and
wherein the processor is configured to: determine, according to a preamble group where a preamble used by the user equipment in the RACH procedure is located, the number of repetitions for the uplink and downlink channels of the user equipment for the RACH procedure.

13. The network device according to claim 11, wherein the broadcast message comprises PRACH resource configuration information, and the PRACH resource configuration information comprises PRACH resource groups corresponding to different numbers of repetitions or levels of number of repetitions for uplink and downlink channels;
wherein the processor is configured to: determine, according to a PRACH resource used by the user equipment in the RACH procedure, the number of repetitions for the uplink and downlink channels of the user equipment for the RACH procedure;
wherein the number of repetitions is directly determined by the network device according to the PRACH resource used by the user equipment, or is determined by the network device according to the determined level of the number of repetitions, and the determined level of the number of repetitions is determined by the network device according to the PRACH resource used by the user equipment.

14. A user equipment, comprising a memory, a processor, and a program stored on the memory and executable by the processor, wherein the processor is configured to execute the program to:
determine the number of repetitions for an uplink channel or uplink and downlink channels of the user equipment for an RACH procedure; and
send uplink information in the RACH procedure by using the number of repetitions, or, send uplink information and receive downlink information in the RACH procedure by using the number of repetitions;
wherein the processor is configured to:
receive threshold information sent b a network device, wherein the threshold information comprises at least one measurement performance threshold for determining the number of repetitions or a level of the number of repetitions for the uplink channel of the user equipment for the RACH procedure; and
determine, according to the at least one measurement performance threshold, the number of repetitions for the uplink channel of the user equipment for the RACH procedure; and
wherein the number of repetitions is directly determined by the user equipment according to the at least one measurement performance threshold, or is determined by the user equipment according to the determined level of the number of repetitions, and the determined level of the number of repetitions is determined by the user equipment according to the at least one measurement performance threshold.

15. The user equipment according to claim 14, wherein the processor is configured to: send the uplink information by using the number of repetitions and perform blind decoding of the downlink information, in the RACH procedure.

16. The user equipment according to claim 14, wherein the processor is further configured to:
receive indication information sent by the network device, wherein the indication information is for indicating the number of repetitions for uplink channels or uplink and downlink channels of a user equipment using a preamble in a preamble group A and a user equipment using a preamble in a preamble group B for an RACH procedure; and
select, according to the indication information, a preamble in a preamble group corresponding to the number of repetitions for the uplink channel;
wherein the processor is configured to send the uplink information and receiving the downlink information, in the RACH procedure, based on the selected preamble and the number of repetitions for the uplink channel.

17. The user equipment according to claim 16, wherein,
the indication information comprises third indication information and fourth indication information, the third indication information is for indicating the number of repetitions for uplink and downlink channels of a user equipment using a preamble in a preamble group A for an RACH procedure, and the fourth indication information is for indicating the number of repetitions for uplink and downlink channels of a user equipment using a preamble in a preamble group B for an RACH procedure; or,
the indication information comprises fifth indication information, sixth indication information, seventh indication information, and eighth indication information, the fifth indication information is for indicating the number of repetitions for an uplink channel of a user equipment using a preamble in a preamble group A for an RACH procedure, the sixth indication information is for indicating the number of repetitions for a downlink channel of the user equipment using the preamble in the preamble group A for the RACH procedure, the seventh indication information is for indicating the number of repetitions for an uplink channel of a user equipment using a preamble in a preamble group B for an RACH procedure, and the eighth indication information is for indicating the number of repetitions for a downlink channel of the user equipment using the preamble in the preamble group B for the RACH procedure; or,
the indication information is for indicating the number of repetitions for uplink and downlink channels of a user equipment using a preamble in a preamble group A for an RACH procedure, and the number of repetitions for uplink and downlink channels of a user equipment using a preamble in a preamble group B for an RACH procedure; or,
the indication information comprises ninth indication information and tenth indication information, the ninth indication information is for indicating the number of repetitions for an uplink channel of a user equipment using a preamble in a preamble group A for an RACH procedure, and the number of repetitions for an uplink channel of a user equipment using a preamble in a preamble group B for an RACH procedure, and the tenth indication information is for indicating the number of repetitions for a downlink channel of the user equipment using the preamble in the preamble group A for the RACH procedure, and the number of repetitions for a downlink channel of the user equipment using the preamble in the preamble group B for the RACH procedure.

18. The user equipment according to claim 16, wherein the processor is configured to: receive, through a broadcast message, the indication information sent by the network device.

19. The user equipment according to claim 18, wherein the indication information is included in at least one of the following pieces of information of the broadcast message: a master information block (MIB), a system information block type 1 (SIB1), remaining minimum system information (RMSI), or, other system information (OSI).

20. The user equipment according to claim 14, wherein the processor is further configured to:
receive PRACH resource configuration information sent by the network device, wherein the PRACH resource configuration information comprises PRACH resource groups corresponding to different numbers of repetitions or levels of number of repetitions for uplink and downlink channels; and
select a PRACH resource corresponding to the determined number of repetitions for the uplink channel;
wherein the processor is configured to: send the uplink information and receive the downlink information, based on the determined PRAM resource and the number of repetitions for the uplink channel, in the RACH procedure.

* * * * *